United States Patent [19]

Durrani

[11] Patent Number: 5,738,369
[45] Date of Patent: Apr. 14, 1998

[54] SNAP-ON AIR BAG AND HORN SWITCH MODULE

[75] Inventor: Sheryar Durrani, Canton, Mich.

[73] Assignee: Breed Automotive Technology, Inc., Lakeland, Fla.

[21] Appl. No.: 727,908

[22] Filed: Oct. 9, 1996

[51] Int. Cl.$^6$ ................................. B60R 21/16
[52] U.S. Cl. ........................ 280/731; 280/728.2
[58] Field of Search ................... 280/728.2, 728.3, 280/731

[56] References Cited

U.S. PATENT DOCUMENTS

| | | | |
|---|---|---|---|
| 5,303,952 | 4/1994 | Shermetaro et al. | 280/731 |
| 5,327,796 | 7/1994 | Ernst et al. | 280/731 |
| 5,350,190 | 9/1994 | Szigethy | 280/728.2 |
| 5,380,037 | 1/1995 | Worrell et al. | 280/728.2 |
| 5,520,409 | 5/1996 | Saderholm | 280/728.2 |

Primary Examiner—Kenneth R. Rice
Attorney, Agent, or Firm—Howard & Howard

[57] ABSTRACT

A plate for mounting an airbag, and for carrying horn switch contacts is snapped to the hub of a steering wheel. The plate may move between actuated and non-actuated positions relative to the hub. Integral springs bias the plate to a non-actuated position. An operator may apply a force to the steering wheel central portion to overcome the spring force and move the plate to an actuated position at which a horn switch is actuated. The plate has slots which snap on snap fingers from the hub. The snap on assembly simplifies and improves the overall assembly of the steering wheel. Moreover, the use of the integral springs also simplifies and improves the overall assembly. The airbag cover is preferably guided in a central area on the steering wheel to insure that the airbag cover is centered, thus minimizing gaps between the airbag cover and the steering wheel.

15 Claims, 3 Drawing Sheets

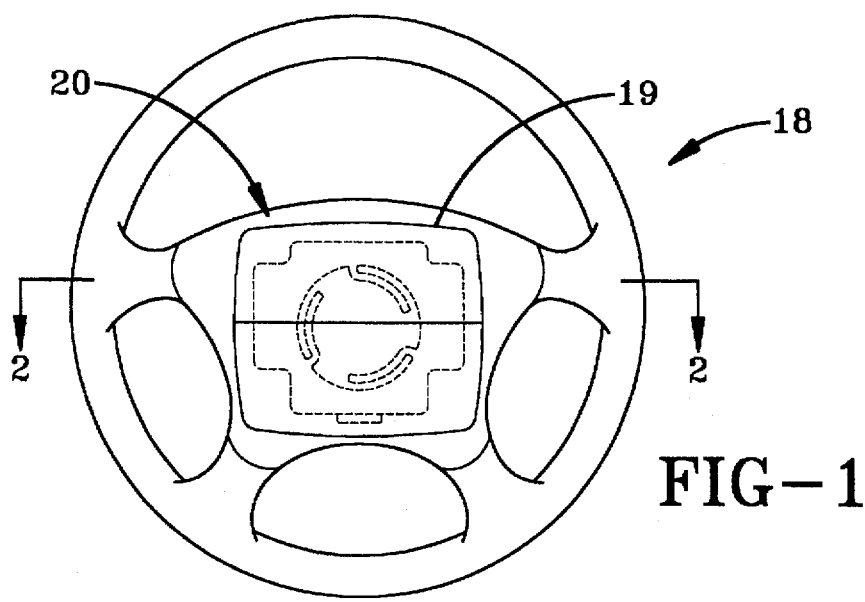
FIG-1
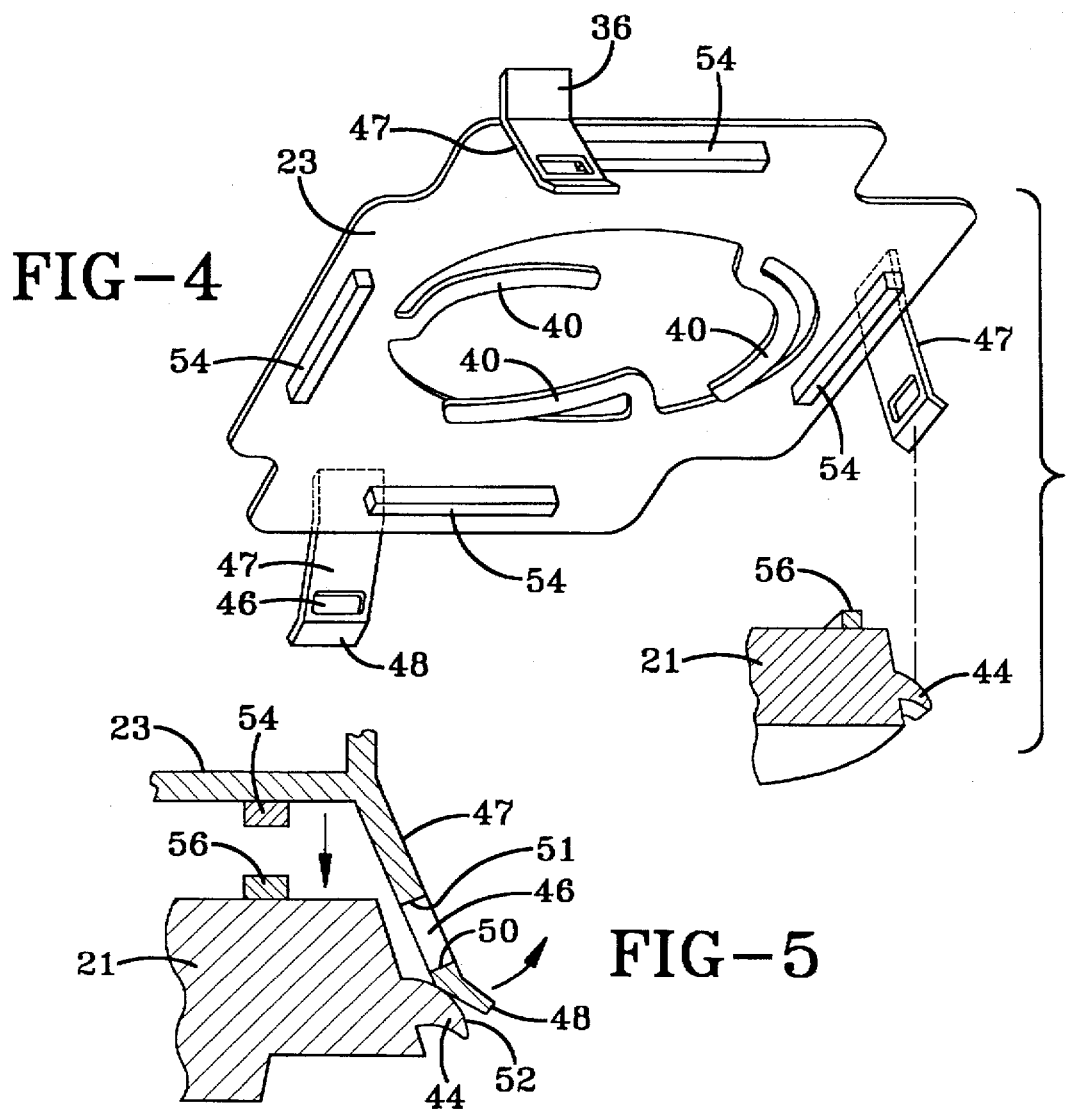
FIG-4
FIG-5

5,738,369

1

SNAP-ON AIR BAG AND HORN SWITCH MODULE

BACKGROUND OF THE INVENTION

This invention relates to an improved air bag and horn switch module which snaps on the steering wheel hub.

Modern vehicles typically carry an air bag and a horn switch within a central portion of the steering wheel. The inclusion of air bags into steering wheels presented challenges to steering wheel designers. Typically, one needed to allow attachment of the steering wheel armature to the steering column of the vehicle. Then, the air bag was attached to the vehicle steering column. Further, a horn switch assembly also needed to be incorporated into the steering wheel. The air bag needs to be near the front of the steering wheel surface, such that it can expand outwardly of the steering wheel.

Typically, horn switches have been placed rearwardly of the air bag. Steering wheels have often incorporated horn switches that mount spring-biased movable members on posts. The movable members are biased to a position where they do not complete the horn circuit. When the driver wishes to sound the horn, the central portion of the wheel is depressed and the spring-bias is overcome, allowing moving contacts to complete the horn circuit. In one well known type of horn switch, the air bag is mounted to the moveable members. The moveable members are spring-biased on posts fixed to the steering wheel hub. These assemblies have some potential deficiencies with regard to manufacturing inaccuracies and tolerances. In some cases, these assemblies have resulted in misaligned parts. Moreover, the assembly of the several posts is relatively complex and time consuming. Also, there has sometimes been part rattle with these assemblies.

In addition, the inclusion of the air bag into the steering wheel assembly has typically required the use of a separate air bag cover. Air bag covers are typically snapped into the steering wheel once the air bag, horn switch, and other internal components are assembled together and to the vehicle. The air bag cover is a separate plastic part that is snapped into the central portion of the steering wheel.

Air bag covers have not always been properly positioned within the steering wheel. There have sometimes been undesirably large gaps between the outer portion of the air big cover, and the inner periphery of the steering wheel. This has thus not provided the aesthetic qualities that vehicles assemblers would like. Part of the problem with positioning air bag covers comes from the potential misalignment of the components within the known steering wheel assemblies due to the use of the post, etc., that have been utilized.

SUMMARY OF THE INVENTION

In a disclosed embodiment of this invention, a plate mounts the air bag and the horn switch and is snapped to the steering wheel assembly. The plate is spring biased away from the steering wheel assembly and to a predictable point. In preferred embodiments of this invention, the plate has several circumferentially spaced tabs, with slots which snap onto snap fingers extending radially outwardly from the steering wheel hub. The snap fingers extend for a distance

2 which is much less than the length of the slot, such that the plate can move relative to the hub with the snap fingers moving within the slot.

In preferred embodiments, integral spring fingers extend downwardly from the plate and into contact with the hub. The spring fingers bias the plate away from the hub such that the bottom of the slots is held against the snap fingers of the hub. The plate carries horn switch contacts such that when an operator depresses the central portion of the wheel, the spring force is overcome, and the plate moves downwardly, closing the horn switch. As discussed above, the length of the slot allows this downward movement.

The snap on assembly is a much simpler procedure than the prior art assembly. Also, the use of integral spring fingers reduce the complexity of assembly.

Since the plate is snapped onto the spring, and spring biased to a known position, misalignment between the parts is minimized. Thus, the cover may be more predictably positioned within the steering wheel, and the gaps between the cover and the wheel are minimized. In other features of this invention, the steering wheel and plate include surfaces to guide the air bag cover into the wheel.

These and other features of the present invention can be best understood from the following specification and drawings, of which the following is a brief description.

BRIEF DESCRIPTION OF THE DRAWINGS

FIG. 1 is an end view of a steering wheel.

FIG. 4 shows the inventive plate.

FIG. 5 shows a detail of the invention.

DETAILED DESCRIPTION OF A PREFERRED EMBODIMENT

FIG. 1 shows a steering wheel 18 having an airbag cover 19 received within a central portion 20 of the wheel. Central portion 20 is defined by an armature and rim, and a foam which surrounds the armature rim. The shape of the cover 19 is shown as generally rectangular, but other shapes are within the scope of this invention.

Figure 2:
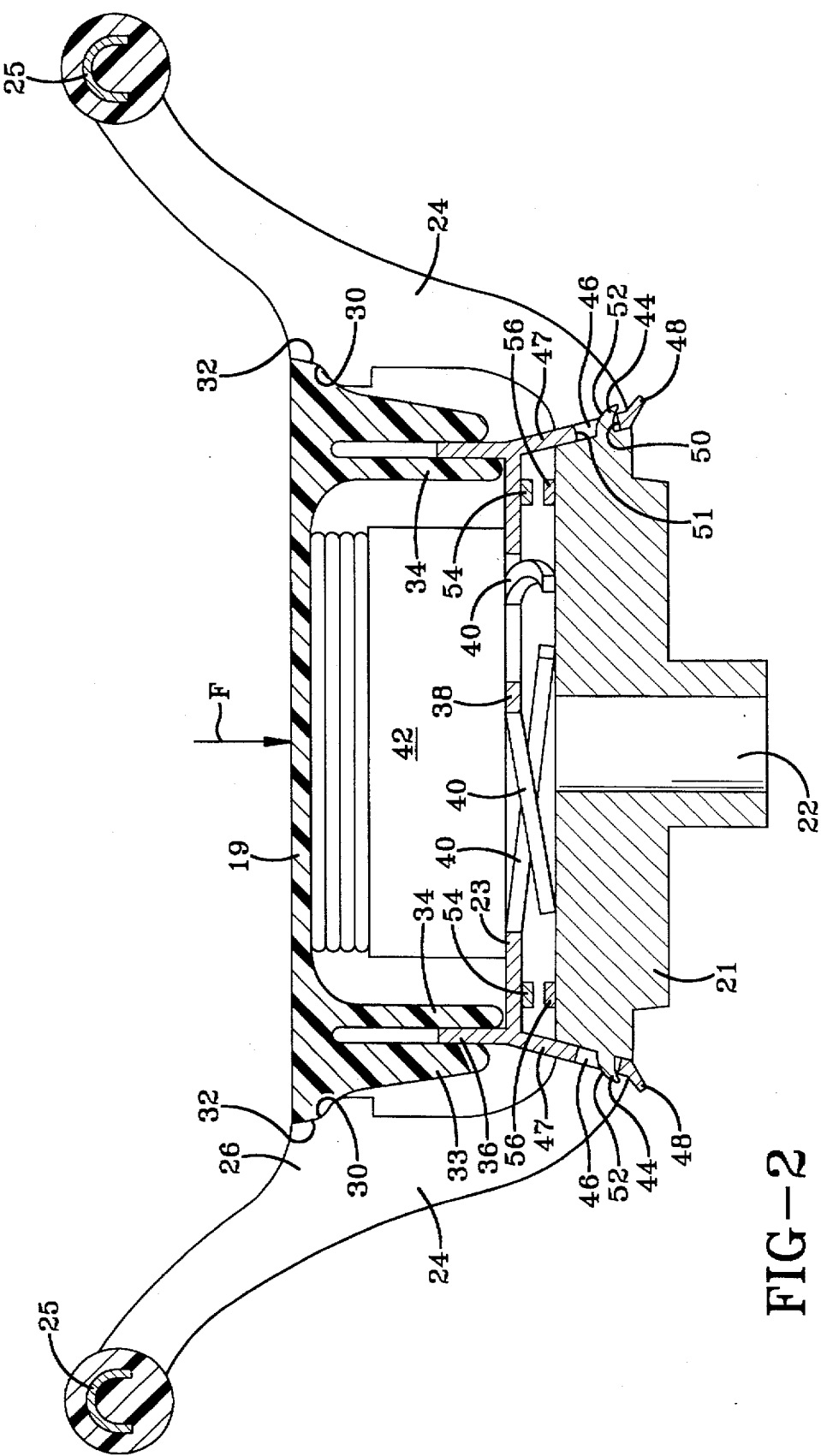
FIG. 2 is a cross-sectional view through a steering wheel incorporating the present invention.

As shown in FIG. 2, a steering wheel hub 21 includes a central bore 22 which will be attached to a steering column rod. Mounting plate 23 is attached to hub 21. A wheel armature 24 extends from the hub 21 to a steering wheel rim 25. As is known, a foam material 26 surrounds the armature 24 and rim 25. The armature 24 and rim 25 may be integrally formed with the hub, or may be formed as separate pieces, and attached in a known fashion.

An air bag cover 19 is positioned within the foam 26. A ramped surface 30 is formed at a central portion of the wheel foam 26, and guides a similarly ramped outer peripheral portion 32 of the cover 19 into position. This ensures that the cover 19 is properly positioned within the steering wheel 20. Cover rims 33 and 34 are spaced on opposed sides of an upstanding rim 36 from plate 23. The inner-fitting rims 33, 34 and 36 secures the air bag cover 19, and ensures it is properly and accurately centered within the surface 30.

Thus, gaps between the cover 19 and the foam portion 26 are minimized, improving the overall appearance of the assembly.

A central portion 38 of the modular plate 23 includes downwardly extending spring fingers 40. Spring fingers 40 may be stamped from the central portion 38, or may be affixed to a bottom face of the central portion 38 in any manner. The spring fingers 40 are formed at several spaced locations. Preferably at least three fingers are utilized. The fingers bias the plate 23 toward cover 19. An air bag 42 is shown schematically positioned above central portion 38.

Hub 21 has radially outwardly extending snap fingers 44. Slots 46 are formed in downwardly extending tabs 47 from plate 23. Snap fingers 44 snap into slots 46. An outer end 48 of the tab 47 extends beyond the snap fingers 44. As shown, the slots 46 extend between ends 50 and 51, and the length of the slot is greater than the length of the snap fingers 44, allowing movement of the plate 23 to achieve a horn blow function.

An outer edge 52 of snap fingers 44 is ramped downwardly to facilitate snapping of tabs 47 onto snap fingers 44. Electrical contacts 54 and 56 are shown schematically spaced with the plate 23 and hub 21, in the non-actuated position. The contracts are illustrated somewhat schematically, and may be configured and attached in a different manner than illustrated.

When an operator wishes to achieve a horn blow function, a force F is applied to the air bag cover 19. Force F overcomes the force from springs 40, and plate 23 moves downwardly relative to hub 21. The slots 46 and tabs 47 allow this movement. When the contacts 54 and 56 move into contact with each other, a horn blow function is achieved. Once the force F is removed, springs 40 again bias the plate 23 back upwardly to the position shown in FIG. 2.

Figure 3:
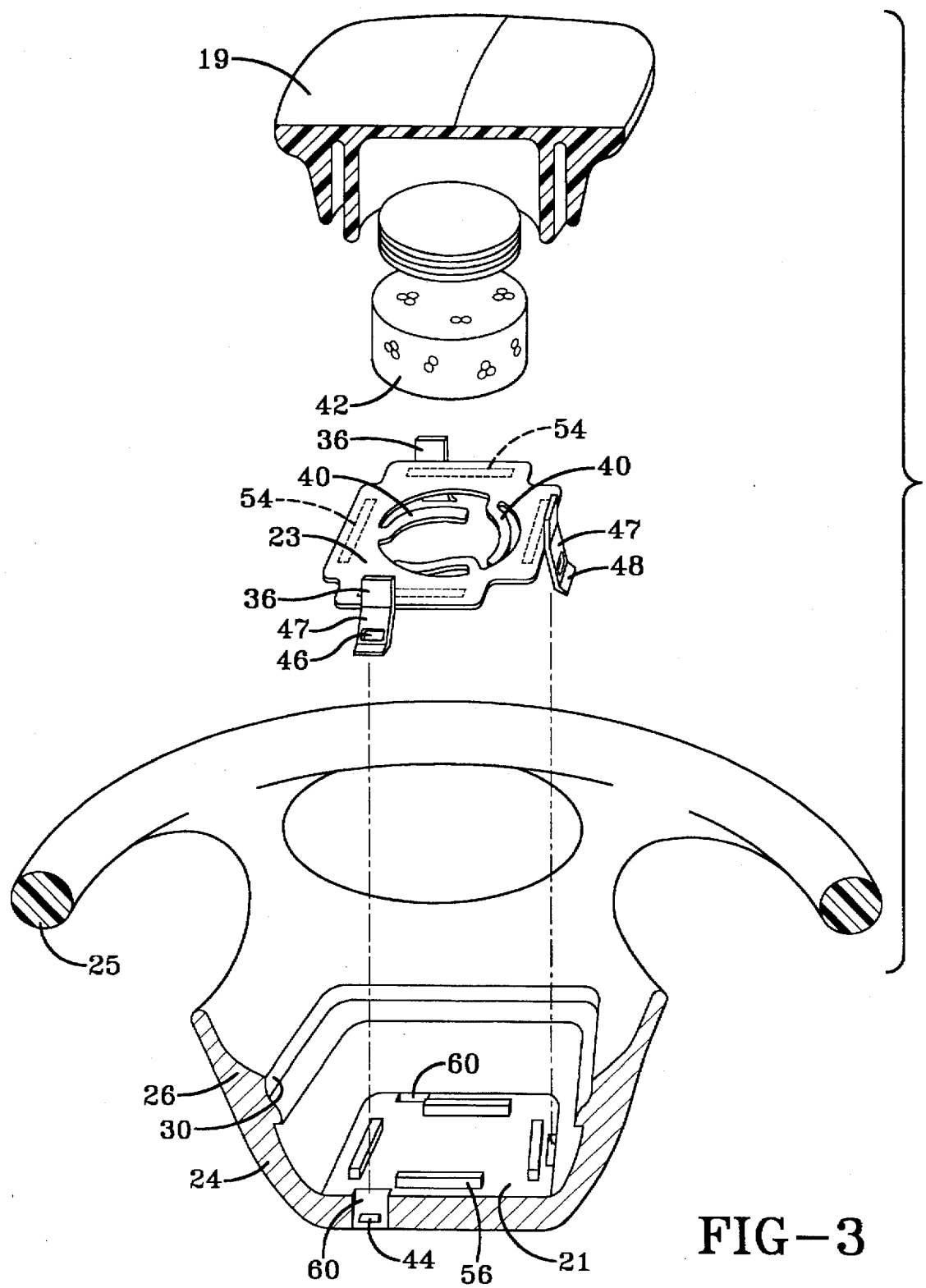
FIG. 3 is an exploded view of the present invention.

FIG. 3 shows a detail of hub 21. As shown, snap fingers 44 are surrounded by small open areas 60, which are then surrounded by foam. As shown, the springs 40 extend integrally from plate 23.

FIG. 4 shows plate 23. As shown, rim 36 may be a discrete local part, as shown. Alternatively, the rim may extend around the periphery of plate 23.

As shown in FIG. 5, ramped outer surface 52 facilitates movement of tabs 47 onto and over the snap finger 44. Once the tab 47 moves between the outermost end of the snap finger 44, the tab 47 will spring back to the position as shown in FIG. 2.

The snap-on plate 23 simplifies the assembly of the steering wheel 20. No complex post or screw assembly is required. In addition, the integral springs 40 in combination with the spring biasing of the slots against the snap fingers 44 ensure predictable positioning for the several components. This improves the overall positioning of the components, and in particular the air bag cover 19. This feature of the system 20 minimizes the gap between the air bag cover 19 and the foam 26 of the steering wheel. In addition, interfitting rims 33, 34, 36 along with the inwardly ramped surfaces 30 and 32 further ensure proper positioning of the air bag cover 19, thus minimizing any gaps.

A preferred embodiment of this invention has been disclosed, however, a worker of ordinary skill in the art will recognize that certain modifications would come within the scope of this invention. For that reason, the following claims should be studied to determine the true scope and content of this invention.

I claim:

1. A steering wheel comprising:

a steering wheel hub having a central bore to be attached to a vehicle steering column, said central bore having a central axis;

a plate secured to said steering wheel hub, said plate being movable axially along said central axis between actuated and non-actuated positions, springs fixed to said plate and biasing said plate towards said non-actuated position; and switch components to actuate a horn switch function when said plate is moved to said actuated position.

2. A steering wheel as recited in claim 1, wherein said plate further mounts an air bag assembly, and said plate is snapped to said hub.

3. A steering wheel as recited in claim 1, wherein said springs are integral fingers extending downwardly from a lower face of said plate, and contacting an upper surface of said hub to bias said plate to said non-actuated position.

4. A steering wheel as recited in claim 1, wherein said switching components include contacts formed on a lower face of said plate, and associated with contacts on an upper face of said hub.

5. A steering wheel as recited in claim 1, wherein said steering wheel has an armature and rim connected to said hub, a foam covering said armature and said rim, and said armature including a central opening for receiving an air bag cover, said central opening having guiding surfaces, an air bag cover having corresponding guiding surfaces and received in said central opening.

6. A steering wheel comprising:

a steering wheel hub having a central bore to be attached to a steering column of a vehicle and centered on an axis;

a plate for mounting an airbag assembly, and for carrying horn switch components, said plate being secured on said hub plate, but axially movable between actuated and non-actuated positions relative to said hub plate;

spring bias structure for biasing said plate toward said non-actuated position;

horn switching components for actuating a horn switch function when said plate is moved to said actuated position; and one of said plate and said hub having slots, and the other having snap fingers, said slots snapping to said snap fingers such that said plate is snapped to said hub, and said spring then biases said plate toward said non-actuated position.

7. A steering wheel as recited in claim 6, wherein said plate includes a plurality of tabs, said tabs having said slots, said snap fingers being formed on outer surfaces of said hub, and said tabs snapping over said snap fingers to secure said tabs to said snap fingers.

8. A steering wheel as recited in claim 7, wherein said snap fingers have ramped outer surfaces to facilitate snapping movement of said tabs to said snap fingers.

9. A steering wheel as recited in claim 8, wherein said plate includes integral spring fingers contacting an abutment surface and biasing said plate toward said non-actuated positions.

10. A steering wheel as recited in claim 8, wherein said plate carries switch components which are brought into contact with corresponding switch components when said plate is moved toward said actuated position.

11. A steering wheel as recited in claim 7, wherein said plate has an upwardly extending rim, and an airbag cover has downwardly extending rims formed on each side of said plate rim, said rims interfitting to center said airbag cover within a steering wheel.

12. A steering wheel comprising:

a steering wheel hub including structure to allow attachment of said hub to the steering column of a vehicle, a steering wheel armature and a steering wheel rim fixed to said hub, a foam material surrounding at least said armature and said rim, and defining a central opening;

an airbag received within said central opening; and an airbag cover received within said central opening and outwardly of said airbag, said central opening including ramped surfaces for guiding said airbag cover to a desired position, said airbag cover including corresponding ramped surfaces.

13. A steering wheel as recited in claim 12, wherein said airbag cover includes two downwardly extending rims, and said airbag is mounted on a plate, said plate including an upwardly extending rim which interfits between said airbag cover rims to further guide and secure said airbag cover.

14. A steering wheel as recited in claim 13, wherein an integral spring biases said plate away from said hub to move said plate rim between said airbag cover rim.

15. A steering wheel as recited in claim 14, wherein said plate is snapped onto said hub to allow movement between two positions, said spring biasing said plate to a first of said two positions.

* * * * *